United States Patent [19]

Morelock

[11] Patent Number: 4,626,516

[45] Date of Patent: Dec. 2, 1986

[54] INFILTRATION OF MO-CONTAINING MATERIAL WITH SILICON

[75] Inventor: Charles R. Morelock, Saratoga Springs, N.Y.

[73] Assignee: General Electric Company, Schenectady, N.Y.

[21] Appl. No.: 760,844

[22] Filed: Jul. 31, 1985

[51] Int. Cl.[4] .................... C04B 35/58; C04B 35/56; C04B 35/52
[52] U.S. Cl. ........................ 501/92; 501/90; 501/96; 501/97; 501/98
[58] Field of Search ................ 501/90, 92, 96, 97, 501/98

[56] References Cited

U.S. PATENT DOCUMENTS

| | | | |
|---|---|---|---|
| 3,036,017 | 5/1962 | Schrewelius | 501/92 |
| 3,246,275 | 4/1966 | Schrewelius | 501/92 |
| 3,251,698 | 5/1966 | Colton | 501/96 |
| 3,285,018 | 11/1966 | Henderson et al. | 501/96 |
| 4,016,313 | 4/1977 | Schrewelius | 501/92 |
| 4,120,731 | 10/1978 | Hillig et al. | 501/92 |
| 4,438,213 | 3/1984 | Furukawa et al. | 501/92 |

*Primary Examiner*—Mark L. Bell
*Attorney, Agent, or Firm*—Jane M. Binkowski; James C. Davis, Jr.; James Magee, Jr.

[57] ABSTRACT

A process for producing a brazable ceramic composite by infiltrating silicon into a porous body at least partly composed of molybdenum to form at least about 5% by volume of a silicide of molybdenum in situ.

21 Claims, 1 Drawing Figure

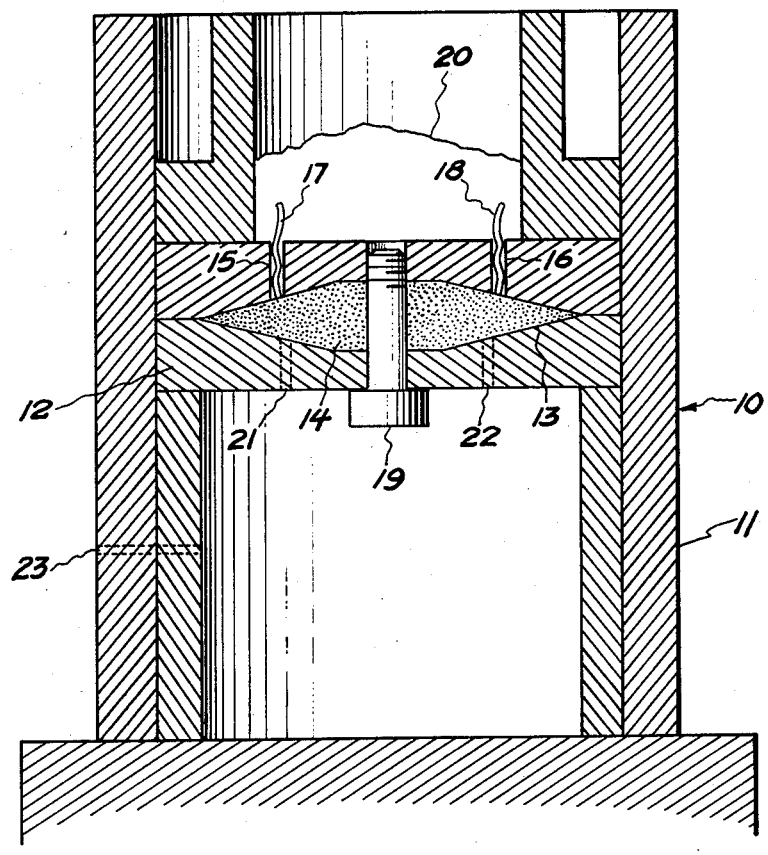

INFILTRATION OF MO-CONTAINING MATERIAL WITH SILICON

The present invention relates to a process for infiltrating silicon into a porous body of a material containing elemental molybdenum to produce a ceramic composite containing a silicide of molybdenum.

The infiltration of materials with silicon has been carried out by using some form of a carbon fiber wick to transport liquid silicon from a reservoir to the material being infiltrated. U.S. Pat. Nos. 4,120,731; 4,141,948; 4,148,894; 4,220,455; 4,238,433; 4,240,835; 4,242,106; 4,247,304 and 4,353,953, assigned to the assignee hereof and incorporated herein by reference disclose such silicon infiltration of materials which include carbon, carbon-coated diamond and/or cubic boron nitride, and blends of carbon with silicon carbide, boron nitride, silicon nitride, aluminum oxide, magnesium oxide and zirconium oxide.

Copending Ser. No. 759,814 filed about July 26, 1985, for INFILTRATION OF MATERIAL WITH SILICON, by C. R. Morelock and assigned to the assignee hereof and incorporated herein by reference discloses a process for producing a composite by contacting a porous body at least partly composed of a substance which reacts with silicon such as carbon or a metal such as molybdenum with a powder mixture composed of silicon and hexagonal boron nitride, heating the resulting structure to a temperature at which the silicon is fluid and infiltrating the fluid silicon into the porous body.

U.S. Pat. No. 4,109,050 assigned to the assignee hereof and incorporated herein by reference discloses a method of reducing the tendency of a silicon-based ceramic composite to form complex silicides when in contact with metals at elevated temperatures by etching the surface of the composite, depositing a blend of aluminum oxide and silicon oxide on the etched surface and firing it.

Generally, ceramic materials are brittle materials which are restricted to applications in which "toughness" is not a major problem. If the "toughness" of these materials can be improved significantly, they would be utilized in many more applications. By toughness of a material it is meant its tolerance to damage. Also, generally, ceramic materials have poor metal wetting properties which makes it difficult to bond them to a metal.

The present invention enables the production of a ceramic composite with good metal wetting properties and good toughness. In the present process, molybdenum is added to a material before silicon infiltration to produce a silicide of molybdenum in situ imparting to the resulting composite significantly reduced sensitivity to machining abuse. In addition, the present composite appears to exhibit microcracking under stress up to fracture.

In the present process molybdenum disilicide powder cannot be part of the present material to be infiltrated since at infiltration temperature it partly decomposes apparently losing gaseous silicon which leaves all of the grains of the remaining molybdenum silicide separated from each other, or from the next grain, by a void resulting in a highly porous phase of a molybdenum silicide. Such concentrated, i.e. nonuniform, porosity causes the grains of the molybdenum silicide to be weakly bonded making the product mechanically weak and useless.

Briefly stated, the present process for producing a composite comprised of at least about 5% by volume of a silicide of molybdenum and having a porosity of less than about 10% by volume of the composite comprises providing a material at least partly comprised of elemental molybdenum or a precursor therefor, forming said material into a porous body having an open porosity ranging from greater than about 10% by volume to about 90% by volume of said body, associating said porous body with silicon, said material having a melting point higher than that of said silicon, heating the resulting structure in a nonoxidizing partial vacuum to a temperature at which said silicon is fluid but below the melting point of said material and infiltrating said fluid silicon into said porous body forming said composite, said fluid silicon reacting with said molybdenum forming said silicide of molybdenum, said molybdenum being present in an amount sufficient to produce said silicide of molybdenum, said partial vacuum being at least sufficient to remove gas from said porous body which blocks said infiltrating fluid silicon.

In the present process, elemental molybdenum reacts with the infiltrating silicon to form at least a sufficient amount of a silicide of molybdenum in situ to make the resulting composite metal-wettable so that it can be brazed or soldered to a metal part. The material or porous body to be infiltrated should contain at least sufficient elemental molybdenum, or precursor therefor, to produce a silicide of molybdenum in an amount of at least about 5% by volume of the resulting composite. The molybdenum can range from about 5% by volume to about 100% by volume of the material to be infiltrated, and the particular amount depends largely on the particular composite desired. Frequently, molybdenum is present in an amount of at least about 10% by volume ranging from about 10% by volume to about 70% by volume, or at least about 20% by volume ranging from about 20% to about 50% by volume, of the material to be infiltrated.

The material to be infiltrated can contain a member selected from the group consisting of elemental carbon, an elemental metal or precursor therefor other than molybdenum which reacts with silicon to form a silicide thereof having a melting point higher than about 1430° C., preferably higher than about 1450° C., a ceramic material which does not react with silicon, diamond and mixtures thereof, and such member preferably is present in an amount of at least about 1% by volume of the material.

More specifically, in addition to a reactive component such as molybdenum, the present material to be infiltrated can contain other reactive component such as elemental carbon and other metal such as, for example, titanium, chromium, tungsten, silver and aluminum. As used herein, the term "elemental carbon" or "carbon" includes all forms of elemental nondiamond carbon including graphite.

The precursor for molybdenum or other metal should decompose completely at a temperature below the infiltration temperature of silicon to produce the metal and gaseous product which vaporize away and/or produce no deleterious residue. Representative of a suitable precursor for molybdenum is molybdenum trioxide.

Generally, that portion of the present material which is not reactive with silicon is comprised of a ceramic material such as, for example, silicon carbide, silicon nitride, boron nitride and aluminum nitride. Diamond may also be present as a nonreactive component depending largely on its particle size, and in a fine particle size it can react with silicon to form silicon carbide.

The present material to be infiltrated can be in a wide variety of forms. For example, it can be in the form of particles, filament, cloth and mixtures thereof. The term "filament" herein includes fiber and whisker. When the material is in the form of particles, it preferably has an average particle size which is less than about 50 microns, more preferably less than about 10 microns, and most preferably it is submicron.

The material to be infiltrated can be formed into a porous body by a number of techniques. For example it can be extruded, injection molded, die-pressed, isostatically pressed or slip cast to produce the porous body of desired size and shape. Preferably, the porous body is of the size and shape desired of the composite. Any lubricants, binders, or similar materials used in shaping the material should have no significant deleterious effect in the present process. Such materials are of the type which evaporate on heating at temperatures below the present infiltration temperature, preferably below 500° C., leaving no deleterious residue.

Alternately, if desired, the present material to be infiltrated can be packed into the cavity of a mold to form a packed or constrained material, i.e. the present porous body.

The present porous body or packed material has an open porosity ranging from greater than about 10% by volume to about 90% by volume of the body, and the particular amount of such open porosity depends largely on the particular composite desired. Specifically, the porous body or packed material can have an open porosity ranging from about 15% by volume to about 80% by volume, or from about 30% by volume to about 60% by volume, of the body. By open porosity of the body, it is meant herein pores or voids which are open to the surface of the body and thereby making the interior surfaces accessible to the ambient atmosphere. Open porosity can be determined by standard mellographic techniques. Preferably, the present packed material or porous body to be infiltrated does not have any closed porosity or does not have any significant amount of closed porosity.

The pores in the porous body or packed material preferably should be distributed uniformly or at least significantly uniformly to prevent formation of excessively large pockets of elemental silicon which may lower the mechanical properties of the resulting infiltrated body or composite, which generally is a polycrystalline body, thereby limiting its applications. The pores can range in size, and generally can range up to about 2000 microns. For best results, the pores are submicron in size.

In carrying out the present process, a structure or assembly is formed comprised of the present porous body or packed material in association with silicon which permits infiltration of silicon into the porous body. In one embodiment of the present invention, an assembly utilizing means for introducing silicon is used. In another embodiment, a structure comprised of the porous body in contact with a powder mixture of silicon and hexagonal boron nitride is used.

Assembly Including Means For Introducing Fluid Silicon

The accompanying FIGURE is a sectional view through one embodiment of an assembly or apparatus for carrying out the present infiltration of silicon using means such as carbon fiber wicks for introducing fluid silicon.

Briefly stated, in this embodiment, the present process for producing a composite comprised of at least about 5% by volume of a silicide of molybdenum and having a porosity of less than about 10% by volume of the composite comprises providing a material at least partly comprised of elemental molybdenum or a precursor therefor, providing a mold with a cavity of desired size and shape and means for introducing fluid silicon into said cavity and means for maintaining a partial vacuum in said cavity, at least substantially filling said cavity with a porous body of said material confining said porous body therein, said porous body having an open porosity ranging from greater than about 10% by volume to about 90% by volume of said body, associating said porous body in said cavity with silicon, said material having a melting point higher than that of said silicon, heating the resulting assembly in a nonoxidizing partial vacuum to a temperature at which said silicon is fluid but below the melting point of said material, introducing said fluid silicon to said confined body via said means for introducing fluid silicon into said cavity, and infiltrating said fluid silicon into said body forming said composite, said partial vacuum being at least sufficient to remove gas from said porous body which blocks said infiltrating fluid silicon, said infiltrating silicon reacting with said molybdenum forming said silicide of molybdenum, said molybdenum being present in an amount sufficient to produce said silicide of molybdenum, and recovering the resulting composite.

In this embodiment, a mold with a cavity of desired shape and size is used. The mold should be made of material which has no significantly deleterious effect on the present process or composite. Preferably, it is made of graphite and preferably it is machinable to the size and shape desired of the final product. Alternatively, the cavity of the mold can be fitted, lined or pressed with a material which is substantially inert with respect to the present process and product, such as hexagonal boron nitride powder, which can be used to produce the final composite of desired shape and size. A parting agent, such as a film of hexagonal boron nitride powder, preferably is sprayed on a material such as graphite to enable a clean separation of the final product from the mold.

The mold has means for introducing fluid silicon into the cavity which, for example, can be comprised of infiltration holes in the mold wherein each infiltration hole is provided with a wick. Preferably, these infiltration holes are located at the top or in the upper portion of the mold so that the flow of fluid silicon into the cavity is promoted by gravity. These holes can vary in number and diameter depending largely on the extent desired for introducing fluid silicon into contact with the confined porous body.

The number of infiltration holes used is not critical but with an increasing number of infiltration holes, the faster the silicon is introduced into contact with the confined porous body within the mold thereby reducing total infiltration time. On the other hand, the infiltration holes should not be so great in number or diameter as to allow the fluid silicon to be introduced into the cavity to the extent that silicon surrounds the confined porous body since that would entrap gas within the body and prevent infiltration of the fluid silicon. Preferably, infiltration of the fluid silicon should proceed through the porous body towards a single external surface or external point of the body to allow removal of pockets of gas therein by the partial vacuum thereby allowing the silicon to infiltrate therethrough. Infiltration of the fluid silicon into the confined body is by capillary action.

Generally, the infiltration holes in the mold range from about 10 mils to 125 mils in diameter and holes of larger size provide no significant advantage. Due to the surface tension of elemental silicon which prevents it from passing through such small holes, each hole is provided with a wick, preferably an elemental carbon fiber wick which passes, i.e. wicks, the fluid silicon through the hole and into the cavity. Generally, the wick extends from the silicon and passes through the infiltration hole into contact with the porous body.

The smaller the infiltration holes, the less likely excess elemental Si material will be left on the finished product. Ordinarily, any excess material on the surface of the finished produt is in the form of a nib or glob which can be ground, machined or polished off in a conventional manner.

The porous body or packed material, preferably in the form required of the composite, should at least substantially fill, or preferably fill, the cavity within the mold in order to produce the final product or composite of desired shape and dimensions since there is no change or no significant change between the volume occupied by the porous body and the final infiltrated product, i.e. composite. The mold, i.e. filled cavity, then is closed. Vents in the mold preferably located in the bottom portion of the mold, are used to evacuate the cavity and maintain the desired partial vacuum therein. The filled mold is associated with a mass of elemental silicon, which preferably is located in the portion of the assembly above the mold.

The accompanying FIGURE shows a cross-section of an assembly or apparatus 10 illustrating this embodiment. Supporting frame 11 is nonmetal, preferably is made of graphite and can be machined to the configuration desired. Mold 12 and cavity 13 are provided with a nonmetallic connector 19, preferably of graphite, which passes through cavity 13 and which has a threaded end to keep mold 12 closed during silicon infiltration. The porous body 14 fills cavity 13 surrounding connector 19. Holes 15 and 16 are provided with wicks 17 and 18 which pass silicon 20 in fluid form into cavity 13 to infiltrate body 14.

Vent holes 21 and 22 allow for the escape of gas from cavity 13 which exit out of vent 23. Vent holes 21, 22 and 23 are used to maintain the required partial vacuum in cavity 13. Connector 19 leaves a hole of like diameter passing through the finished composite which has the form of a wheel with a sharp edge which may be useful as a grinding wheel.

The resulting assembly or apparatus 10 is placed within a furnace, the present infiltration procedure is carried out, and the resulting composite recovered from the mold.

Structure or Assembly Using Powder Mixture of Silicon and Hexagonal Boron Nitride Briefly stated, in this embodiment, the present process for producing a composite comprised of at least about 5% by volume of a silicide of molybdenum and having a porosity of less than about 10% by volume of the composite comprises providing a material at least partly comprised of elemental molybdenum or a precursor therefor, forming a porous body of said material having an open porosity ranging from greater than about 10% by volume to about 90% by volume of said body, contacting said body with a mixture comprised of silicon powder and hexagonal boron nitride powder wherein said silicon powder ranges in amount from greater than about 10% by volume to less than about 90% by volume of said mixture, said material having a melting point higher than that of said silicon powder, heating the resulting structure in a nonoxidizing partial volume to a temperature at which said silicon is fluid but below the melting point of said material and which does not have a significantly deleterious effect on said material and infiltrating said fluid silicon into said porous body forming said composite, said partial vacuum being at least sufficient to remove gas from said porous body which blocks said infiltrating fluid silicon, said infiltrating silicon reacting with said molybdenum forming said silicide of molybdenum, said molybdenum being present in an amount sufficient to produce said silicide of molybdenum.

In carrying out this embodiment, a mixture of elemental silicon powder and hexagonal boron nitride powder is formed and contacted with the surface of the porous body or packed material to be infiltrated. Since molten silicon does not wet or react with the hexagonal boron nitride powder, at the temperatures used, it does not coalesce, and therefore permits easy movement by vapor and liquid flow to the surfaces of the porous body or constrained material where it reacts, wets and infiltrates. Without the hexagonal boron nitride powder there would be not control over the silicon infiltration. Specifically, the silicon would not infiltrate the body uniformly and would form droplets on its surface thereby leaving significantly large silicon nodules thereon which would require diamond machining for their removal.

The silicon powder can range widely in size but preferably should not be greater than about 100 mesh, i.e. no greater than about 150 microns, since a larger particle size would have a tendency to coalesce and not infiltrate the body. Preferably, the silicon powder has a particle size of about 200 mesh, i.e. no greater than about 75 microns.

The hexagonal boron nitride powder can range widely in size but preferably should not be greater than about 100 mesh, i.e. no greater than about 150 microns, since a larger particle size may allow the silicon to coalesce thereby preventing its infiltration into the body. Preferably, the hexagonal boron nitride powder has a particle size of about 325 mesh, i.e. no greater than about 45 microns.

As used herein by mesh it is meant U.S. Sieve Size.

In the present powder mixture of silicon and hexagonal boron nitride, the silicon ranges in amount from greater than about 10% by volume to about 90% by volume of the mixture depending largely on the rate at which the infiltration of the fluid silicon into the porous body is to be carried out. The smaller the amount of silicon in the mixture, the slower will be the rate of infiltration. Preferably, the silicon content of the mixture ranges from about 50% by volume to about 85% by volume, more preferably from about 60% by volume to about 80% by volume, of the mixture. Silicon should be present in the powder mixture at least in an amount sufficient to produce the desired composite.

The mixture of silicon and hexagonal boron nitride powders can be formed by a number of conventional techniques. For example, the two powders can simply be mixed together to produce the present mixture. At least a significantly uniform mixture of the two powders is formed, and preferably a uniform or substantially uniform mixture is formed.

The present mixture of silicon and hexagonal boron nitride powders can be used in a variety of forms such as, for example, a pressed powder or in the form of a mold with a cavity of the size and shape desired of the final infiltrated body or composite. Before infiltration, when in contact with the porous body or compacted material, the present mixture preferably has a porosity of less than about 50% by volume, more preferably less than about 40% by volume, and still more preferably less than about 30% by volume of the powder mixture.

Specifically, in this embodiment, a structure can be formed by a number of techniques comprised of the present mixture of silicon and hexagonal boron nitride in contact with the porous body or packed material to be infiltrated. In one form of this embodiment, such a structure is comprised of the porous body with a deposit of the pressed powder mixture thereon. In another form of this embodiment, the structure is comprised of the material packed in a mold of the powder mixture. The extent to which the powder mixture is in contact with the surface of the porous body depends largely on the particular composite desired. Generally, the porous body or packed material is immersed in, or enveloped by, the present powder mixture leaving none of its surface exposed.

In one form of this embodiment, supporting means, preferably graphite or other elemental carbon, provided with a cavity are used and the present porous body is embedded in the present powder mixture in the cavity. Preferably, the resulting assembly is heated to infiltration temperature. Any supporting means used in the present process should have no significant deleterious effect thereon. Also, preferably, the cavity of any supporting means is precoated with a parting agent such as hexagonal boron nitride to prevent sticking.

In another form of this embodiment, the present mixture of silicon and hexagonal boron nitride powders can be formed into a mold with the desired cavity by a number of techniques. For example, cavity-containing supporting means, preferably graphite or other elemental carbon with a cavity machined therein, is used and a layer of the mixture is pressed against the inner surface of such cavity producing the desired mold. In another mold-forming technique, the mixture can be extruded, injection molded or die-pressed to produce a mold with a cavity of the size and shape of the composite. Any lubricants, binders or similar materials used in shaping the powder mixture should have no significant deleterious effect in the present process. Such materials are of the type which evaporate or decompose on heating below the present infiltration temperature, preferably below 500° C., leaving no deleterious residue. Representative of useful binders are liquid epoxy resin and water. In one technique a liquid resin composition is used which hardens on exposure to air, or when heated, and the mold is then dried or curved to give it the desired mechanical strength.

In a first specific form of this embodiment wherein a mold of the present mixture of silicon and hexagonal boron nitride powders is first formed, a predetermined quantity of the powder mixture is mixed with a small amount of binder material and then placed in a boron nitride coated cavity machined in a graphite block. This damp mixture is then pressed at a suitable pressure, usually about 100 psi, with a metal master the exact shape of the silicon infiltrated part desired. After curing or drying, the metal master is removed and the resulting cavity of the powder mixture is filled with material that is to be infiltrated with silicon. Additional powder mixture is placed on top of the filled cavity and pressed at a suitable pressure, preferably to about 100 psi, with a metal ram leaving none of the material exposed. The ram is then removed leaving a structure in the graphite cavity comprised of the present porous body enveloped by a mold of the present powder mixture. Preferably, hexagonal boron nitride powder is placed over the mixture. Porous carbon felt pads are then placed on top of the hexagonal boron nitride powder and held in place with a small block of graphite which is secured to the cavity-containing graphite with graphite screws or wrapped and tied with carbon fiber tow. The hexagonal boron nitride powder placed over the mixed powder provides a barrier to prevent excessive silicon reaction with the carbon felt. The carbon felt holds all of the powders in place during evacuation and heating. Also, the carbon felt is very porous and allows gas to escape. The complete graphite assembly is placed in a vacuum furnace, evacuated to preferably about 0.1 torr, and heated to the infiltration temperature for the time necessary. When cool and restored to atmospheric pressure, the assembly can be removed from the furnace, disassembled, and the silicon infiltrated part removed from the powder mixture.

In a second specific form of this embodiment, a previously prepared porous body, is embedded or immersed, in a predetermined quantity of the present powder mixture contained in a boron nitride coated cavity machined in a block of graphite. The powder mixture and porous body are pressed under sufficient pressure, for example about 100 psi, with preferably a metal rim. The ram is then removed leaving a structure comprised of the porous body enveloped by the pressed powder mixture supported in the graphite block, and from this point on, the procedure is the same as disclosed for the first specific form of this embodiment.

Upon completion of the infiltration, a highly porous layer or deposit of hexagonal boron nitride, or mostly hexagonal boron nitride, remains which is mechanically weak and which is easily brushed or scraped off the composite.

Infiltration Procedure

The present structure or assembly is heated to infiltration temperature in a nonoxidizing partial vacuum wherein the residual gases have no significantly deleterious effect on said structure or assembly and the present infiltration is carried out in such nonoxidizing partial vacuum. Preferably, such nonoxidizing partial vacuum is provided before heating is initiated. The partial vacuum should be at least sufficient to remove pockets of gas which may be trapped within the porous body which would block the infiltrating fluid silicon. Generally, such a partial vacuum ranges from about 0.01 torr to about 2 torr, and usually from about 0.01 torr to about 1 torr to insure removal of entrapped gas in the body being infiltrated.

Ordinarily and as a practical matter, the furnace used is a carbon furnace, i.e. a furnace fabricated from elemental carbon. Such a furnace acts as an oxygen getter for the atmosphere within the furnace reacting with oxygen to produce CO or $CO_2$ and thereby provides a nonoxidizing atmosphere, i.e. the residual gases have no significantly deleterious effect on the infiltrating silicon.

The present infiltration cannot be carried out in air because the liquid silicon would oxidize to form solid silica before any significant infusion by silicon occurred. In such instance where a carbon furnace is not used, it is preferable to have an oxygen getter present in the furnace chamber, such as elemental carbon, in order to insure the maintenance of a nonoxidizing atmosphere. Alternatively, such nonoxidizing atmosphere, or atmosphere which has no significant deleterious effect on the structure within the furnace, can be provided by a sufficiently high partial vacuum, i.e. about $10^{-2}$ torr to 2 torr.

The present infiltration is carried out at a temperature at which silicon is fluid and which has no significant deleterious effect on the material being infiltrated. The present infiltration temperature ranges from a temperature at which the silicon becomes fluid to a temperature at which there is no significant vaporization of the silicon. Preferably, the present infiltration temperature ranges from about 1375° C., or from about 1400° C., or from greater than about 1400° C. to about 1600° C. By a temperature at which silicon is fluid it is meant herein a temperature at which the silicon is readily flowable. Specifically, when silicon is at its melting temperature, it has a high viscosity, but as its temperature is raised, it becomes less viscous and at a temperature about ten degrees higher than its melting point, it becomes fluid. The melting point of the silicon can vary depending largely on the particular impurities which may be present. The temperature at which the silicon is fluid is the temperature at which it will infuse or infiltrate through the capillary-size passages, interstices or voids of the present packed material or porous body. With increase in temperature, the flowability of the fluid silicon increases resulting in a faster rate of infiltration and reaction.

The fluid silicon is highly mobile and highly reactive with elemental molybdenum, i.e. it has an affinity for elemental molybdenum, wetting it and reacting with it to form a silicide of the molybdenum. The fluid silicon also has an affinity for any metal with which it reacts to form the silicides thereof. In addition, the fluid silicon has an affinity for elemental carbon, wetting it and reacting with it to form silicon carbide.

In the present process, sufficient silicon is infiltrated into the porous body or packed material, infusing or infiltrating through the voids or pores of the porous body or packed material by capillary action to react with molybdenum therein to form a silicide of molybdenum and also to fill pores or voids which may remain to produce the present composite.

Preferably, in the present process, sufficient silicon is infiltrated into the porous body or packed material to react with all of the elemental carbon which may be present forming silicon carbide, or react with all the elemental metal which may be present forming a silicide of the metal, and also to fill pores or voids which may remain producing the present composite.

The resulting infiltrated body or composite is cooled in an atmosphere which has no significant deleterious effect on it, preferably it is furnace cooled in the nonoxidizing partial vacuum to about room temperature, and the resulting composite is recovered.

The period of time required for infiltration by the silicon is determinable empirically and depends largely on the size of the porous body or packed material and extent of infiltration required, and frequently it is completed within about 15 or 20 minutes.

The present composite has a porosity of less than about 10% by volume, preferably less than about 5% by volume, and most preferably less than about 1% by volume of the composite. Most preferably, the composite is void- or pore-free or has no significant or no detectable porosity. Preferably, any voids or pores in the composite are small, preferably less than 1 micron, and uniformly or substantially uniformly distributed in the composite. Specifically, any voids or pores are sufficiently uniformly distributed throughout the composite so that they have no significant deleterious effect on its mechanical properties.

The present composite can range widely in composition. However, it will always be comprised of a silicide of molybdenum in an amount of at least about 5% by volume of the composite. Also, it will always be comprised of elemental silicon in an amount of at least about 1% by volume of the composite.

In one embodiment of this invention, the polycrystalline composite is comprised of from about 5% by volume to about 99% by volume of a silicide of molybdenum and the balance is elemental silicon.

In another embodiment of the invention, the present polycrystalline composite is comprised of a silicide of molybdenum in an amount of at least about 5% by volume of the composite, elemental silicon in an amount of at least about 1% by volume of the composite, and a member selected from the group consisting of a ceramic material which does not react with silicon, diamond, an elemental metal which reacts with silicon to form a silicide thereof having a melting point higher than about 1430° C. or higher than about 1450° C., a silicide of a metal other than molybdenum having a melting point higher than about 1430° C. or higher than about 1450° C., and mixtures thereof.

In yet another embodiment of this invention, the polycrystalline composite is comprised of a silicide of molybdenum in an amount of at least about 5% by volume of the composite elemental silicon in an amount of at least about 1% by volume of the composite, and a member selected from the group consisting of silicon carbide, silicon nitride, boron nitride, aluminum nitride, diamond, a silicide of titanium, a silicide of chromium, a silicide of tungsten, a silicide of silver, a silicide of aluminum, elemental molybdenum, elemental titanium, elemental chromium, elemental tungsten, elemental silver, elemental aluminum and mixtures thereof.

The member of the group in the present composite is present in an amount of at least about 1% by volume, preferably at least about 50% by volume, more preferably at least about 80% by volume, and most preferably at least about 90% by volume of the composite.

In one embodiment, the present composite is free of elemental nondiamond carbon phase. However, in another embodiment, the present composite may contain elemental nondiamond carbon phase carbon phase in an amount ranging up to about 5% by volume of the composite provided such nondiamond elemental carbon phae is sufficiently distributed throughout the composite so as not to have any significant deleterious effect on its mechanical properties.

The present ceramic composite is an integral strongly bonded body bonded by the reaction product of the infiltrating silicon and molybdenum, i.e. a silicide of molybdenum, and by elemental silicon. It can also be bonded by the reaction product of the infiltrating silicon and any metal which forms a silicide therewith. In addition, it can be bonded by silicon carbide formed in situ by the reaction of the infiltrating silicon and elemental carbon.

The present composite can have an average crystal or grain size which can vary depending on its particular application, and generally it has an average crystal or grain size ranges from submicron to about 2000 microns. Preferably, the present composite has an average crystal or grain size of less than about 25 microns.

One particular advantage of this invention is that the present composite can be produced directly in a wide range of sizes and shapes which heretofore may not have been able to be manufactured or which may have required expensive and tedious machining. For example, the present composite can be as long as several inches, or as long as desired, and be of very complex geometry, and specifically, it can be produced in the form of a tube or a hollow cylinder, a ring, a sphere or a bar having a sharp point at one end. Also, since the present composite can be produced in a predetermined configuration of predetermined dimensions, it requires little or no machining.

The present composite has a wide range of applications depending largely on its particular composition. It can be used, for example, as a wear resistant part, bearing or tool insert.

The present ceramic composite is a brazable or solderable material. Specifically, it can be brazed or soldered to a metal part.

The present ceramic composite has a contact or wetting angle of less than 90 degrees. More specifically, the present composite is wet by a liquified metal or alloy used in bonding metal parts and with such metal or alloy it has a contact or wetting angle of less than 90 degrees. The contact angle between a drop of liquid and a plane solid surface is one method of measuring wettability. The contact angle decreases with increasing wettability and when the contact angle is zero, the liquid is considered to wet the solid completely.

The invention is further illustrated by the following examples where, unless otherwise stated, the procedure was as follows:

Commercially pure 200 mesh (no greater than about 75 microns) silicon powder and 235 mesh (no greater than about 45 microns) hexagonal boron nitride powder were used.

Four parts of the silicon powder and one part of the hexagonal boron nitride powder were dry mixed in a conventional manner by stirring to produce a substantially uniform mixture.

The "Epon 828" used is a resin formed from the reaction of epichlorohydrin and Bisphenol A, which is a liquid at room temperature and which has an epoxide equivalent of 185-192. Epon 828 decomposes completely below 1300° C.

The curing agent used was diethylenetriamine, a liquid commonly called DTA which cures Epon 828 thereby solidifying it.

Commercially pure 325 mesh elemental molybdenum powder, 325 mesh cubic boron nitride powder and 220 mesh silicon carbide powder were used.

EXAMPLE 1

A graphite block having a cylindrical cavity with an inner diameter of about ⅝ inch and about ⅝ inch deep was used. All of the inner surface of the cavity was sprayed with a slurry of hexagonal boron nitride which left a thin coating of the boride thereon. About 2 grams of the present powder mixture of silicon and hexagonal boron nitride was dampened with about a drop of Epon 828 and a thin continuous layer of the moist mixture was pressed under a pressure of about 100 psi onto a portion of the inner surface of the graphite cavity with a metal master the exact shape and dimensions of the disc desired. The metal master was then removed leaving a mold of the powder mixture with a disc-shaped cavity of 0.5 inch inner diameter and 0.05 inch deep. The graphite block was heated in an oven at 100° C. for about 10 minutes to cure the mold. About 6 parts of the cubic boron nitride powder and one part of the molybdenum powder were dry mixed by stirring to produce a substantially uniform mixture. About 0.16 gram of this molybdenum-cubic boron nitride mixture was placed in the disc-shaped cavity. A layer of the powder mixture of silicon and hexagonal boron nitride was deposited on top of the molybdenum-cubic boron nitride mixture leaving none of its surface exposed and pressed to about 100 psi with a metal ram forming a compacted mixture or porous body having an estimated open porosity of about 25% by volume of the body. The ram was then removed leaving a structure comprised of a disc-shaped porous body enveloped by a mold of the powder mixture of silicon and hexagonal boron nitride. The mold had a porosity of about 35% by volume. A layer of hexagonal boron nitride powder was deposited on top of the mold in the graphite cavity. Porous carbon felt pads were placed on top of the boron nitride powder and held in place with a small block of graphite which was placed on top of the pads and secured to the cavity-containing graphite block with graphite screws.

The complete graphite assembly was placed in a graphite vacuum furnace which was evacuated to about 0.1 torr and maintained at about 0.1 torr during silicon infiltration and subsequent furnace-cooling to room temperature. The residual gases in the furnace were non-oxidizing.

The furnace was heated to about 1375° C. and maintained at such temperature for about 10 minutes. The power was then cut off and the assembly was furnace-cooled to room temperature.

A structure comprised of the silicon infiltrated disc in a porous mold was recovered from the graphite cavity without sticking. The porous mold was comprised mostly of hexagonal boron nitride and was easily removed from the disc with a metallic brush.

The faces of the infiltrated disc, i.e. present composite, were polished using a 325 mesh diamond wheel. Microscopic examination at 500X of the polished surfaces showed that the composite was comprised of a phase of silicide of molybdenum, a cubic boron nitride phase and a phase of elemental silicon. No elemental molybdenum was detected. The silicide of molybdenum was present in an amount of more than 10% by volume, the cubic boron nitride phase was present in an amount of more than 10% by volume, and the phase of silicon was present in an amount of more than 5% by volume of the composite. The composite had less than 5% by volume porosity as determined by its density and microscopic examination. The pores were small, generally less than one micron, and were distributed substantially uniformly in the examined surfaces of the composite. The composite had an average crystal size of less than about 50 microns.

A commercially available metal alloy solder, known as silver solder, was deposited on one face of the composite. A disc of elemental molybdenum was then placed on the solder forming a sandwich with the composite. The sandwich was fired in air to about 500° C., which was above the melting point of the solder, and then allowed to cool to room temperature. The fired sandwich was cut in half to examine its cross-section. No pore or voids were visible at the interface which indicated that the solder had completely wet the face of the present composite and that it had a wetting angle substantially lower than 90 degrees. The molybdenum was strongly bonded to the present composite.

A second composite was prepared in the same manner. This composite was associated with sonic means and placed under a load which was gradually increased. With each microcrack formed in the composite, a sound was heard, but only after several soundings of microcrack formation did the composite fracture.

The composite would be useful as a wear resistant part.

EXAMPLE 2

This example was carried out in substantially the same manner as Example 1 except that a perform, i.e. porous body, of a mixture of molybdenum and silicon carbide was made initially, and the powder mixture of silicon and hexagonal boron nitride was not initially formed into a mold.

Specifically, at room temperature, DTA curing agent was mixed with 0.01 gram Epon 828 resin in an amount of 10% by weight of the Epon 828, and this mixture was then admixed with about 0.16 gram of a mixture of about 6 parts silicon carbide and about one part molybdenum. The resulting mixture was placed in the cylindrical cavity of a metal block and pressed into the form of a disc with a metal plunger. The resulting assembly was placed in a 100° C. oven for one hour to cure, i.e. harden, the Epon 828. The resulting disc was recovered without sticking. The disc was 0.5 inch in diameter, 0.05 inch thick and had an estimated open porosity of about 25% by volume of the disc.

The disc was immersed, i.e. enveloped, in the powder mixture of silicon and hexagonal boron nitride in the cavity of a graphite block precoated with hexagonal boron nitride and pressed with a metal ram at about 100 psi compacting the powder mixture to a porosity of about 35% by volume of the powder mixture. The remaining procedure to form the infiltrated disc was the same as disclosed in Example 1.

The resulting silicon infiltrated disc was recovered from the graphite cavity without sticking. Some powder adhered to the disc but was easily removed with a metallic brush.

The faces of the infiltrated disc, i.e. present composite, were polished using a 325 mesh diamond wheel. Microscopic examination at 500X of the polished surfaces showed that the composite was comprised of a phase of a silicide of molybdenum, a silicon carbide phase and a phase of elemental silicon. No elemental molybdenum was detected. The silicide of molybdenum was present in an amount of more than 10% by volume, the silicon carbide phase was present in an amount of more than 10% by volume, and the phase of silicon was present in an amount of more than %% by volume of the composite. The composite had less than 5% by volume porosity as determined by its density and microscopic examination. The pores were small, generally less than one micron, and were distributed substantially uniformly in the examined surface of the composite. The composite had an average crystal size of less than about 50 microns.

The same solder was applied in the same manner and a sandwich formed, fired and examined as disclosed in Example 1. The results were the same. No pore or voids were visible at the interface which indicated that the solder had completely wet the face of the present composite and that it had a wetting angle substantially lower than 90 degrees. The molybdenum was strongly bonded to the present composite.

A second composite was prepared in the same manner and the same sonic measurement was made as disclosed in Example 1. Only after several soundings of microcrack formation did the composite fracture.

The composite would be useful as a wear resistant part.

What is claimed is:

1. An integral polycrystalline composite having a contact angle of less than 90 degrees and a phase composition consisting essentially of a silicide of molybdenum in an amount of at least about 5% by volume of the composite, elemental silicon in an amount of at least about 1% by volume of the composite and silicon carbide in an amount of at least about 90% by volume of said composite, said silicide of molybdenum being formed in situ, said composite being bonded by at least said silicide of molybdenum, said composite having a substantially uniform porosity of less than about 5% by volume of the composite.

2. An integral polycrystalline composite having a contact angle of less than 90 degrees and a phase composition consisting essentially of a silicide of molybdenum in an amount of at least about 5% by volume of the composite, elemental silicon in an amount of at least about 1% by volume of the composite, and a member selected from the group consisting of a ceramic material which does not react with silicon, diamond, a silicide of a metal other than molybdenum having a melting point higher than about 1430° C., a mixture of said silicide member of said group with an elemental metal other than molybdenum which reacts with silicon to form a silicide thereof having a melting point higher than about 1430° C., and a mixture thereof, said member being present in an amount of at least about 90% by volume of said composite, said silicide of molybdenum being formed in situ, said composite being bonded by at least said silicide of molybdenum, said composite having a substantially uniform porosity of less than about 5% by volume of the composite.

3. An integral polycrystalline composite having a contact angle of less than 90 degrees and a phase composition consisting essentially of a silicide of molybdenum in an amount of at least about 5% by volume of the composite, elemental silicon in an amount of at least about 1% by volume of the composite, and a member selected from the group consisting of silicon nitride, cubic boron nitride, aluminum nitride, diamond, a silicide of titanium, a silicide of chromium, a silicide of tungsten, a silicide of silver, a silicide of aluminum, elemental molybdenum, a mixture of said silicide of titanium and elemental titanium, a mixture of said silicide of chromium and elemental chromium, a mixture of said silicide of tungsten and elemental tungsten, a mixture of said silicide of silver and elemental silver, a mixture of said silicide of aluminum and elemental aluminum and a mixture thereof, said member of said group being present in an amount of at least about 80% by volume of the composite, said silicide of molybdenum being formed in situ, said composite being bonded by at least said silicide of molybdenum, said composite having a substantially uniform porosity of less than about 10% by volume of said composite.

4. The composite according to claim 3 wherein said member is present in an amount of at least about 90% by volume of said composite and said composite has a porosity of less than about 5% by volume of said composite.

5. The composite according to claim 3 wherein said member is diamond.

6. The composite according to claim 1 wherein at least part of said silicon carbide is formed in situ and said in situ-formed silicon carbide also bonds said composite.

7. An integral polycrystalline composite having a contact angle of less than 90 degrees and a phase composition consisting essentially of a silicide of molybdenum in an amount of at least about 5% by volume of the composite, elemental silicon in an amount of at least about 1% by volume of the composite, and a ceramic material which does not react with silicon in an amount of at least about 90% by volume of the composite, said silicide of molybdenum being formed in situ, said composite being bonded by at least said silicide of molybdenum, said compact having a substantially uniform porosity of less than about 5% by volume of said composite.

8. An integral polycrystalline composite having a contact angle of less than 90 degrees and a phase composition consisting essentially of a silicide of molybdenum in an amount of at least about 5% by volume of the composite, elemental silicon in an amount of at least about 1% by volume of the composite, and a member selected from the group consisting of silicon nitride, cubic boron nitride, aluminum nitride, and diamond, said member of said group being present in an amount of at least about 80% by volume of the composite, said silicide of molybdenum being formed in situ, said composite being bonded by at least said silicide of molybdenum, said composite having a substantially uniform porosity of less than about 10% by volume of said composite.

9. The composite according to claim 8 wherein said member is silicon nitride, present in an amount of at least about 90% by volume and said porosity is less than about 5% by volume.

10. The composite according to claim 8 wherein said member is cubic boron nitride present in an amount of at least about 90% by volume and said porosity is less than about 5% by volume.

11. The composite according to claim 8 wherein said member is aluminum nitride present in an amount of at least about 90% by volume and said porosity is less than about 5% by volume.

12. The composite according to claim 8 wherein said member is diamond present in an amount of at least about 90% by volume of said composite and said porosity is less than about 5% by volume.

13. An integral polycrystalline composite having a contact angle of less than 90 degrees and a phase composition consisting essentially of a silicide of molybdenum in an amount of at least about 5% by volume of the composite, elemental silicon in an amount of at least about 1% by volume of the composite, and a member selected from the group consisting of a silicide of titanium, a silicide of chromium, a silicide of tungsten, a silicide of silver, a silicide of aluminum, molybdenum, a mixture of a silicide of titanium and elemental titanium, a mixture of a silicide of chromium and elemental chromium, a mixture of a silicide of tungsten and elemental tungsten, a mixture of a silicide of silver and elemental silver, a mixture of a silicide of aluminum and elemental aluminum, and a mixture thereof, said silicide of molybdenum being formed in situ, said member being present in an amount of at least about 80% by volume of said composite, said composite being bonded by at least said silicide of molybdenum, said composite having a substantially uniform porosity of less than about 10% by volume of said composite.

14. The composite according to claim 13 wherein said member is present in an amount of at least about 90% by volume of said compact, and said porosity is less than about 5% by volume.

15. The composite according to claim 13 wherein said silicide of molybdenum is present in an amount of at least about 10% by volume of the composite.

16. The composite according to claim 3 wherein said silicide of molybdenum is present in an amount of at least about 10% by volume of the composite.

17. The composite according to claim 2 wherein said silicide member of said group is formed in situ and also bonds said composite.

18. The composite according to claim 3 wherein said silicide member of said group is formed in situ and also bonds said composite.

19. The composite according to claim 13 wherein said silicide member of said group is formed in situ and also bonds said composite.

20. An integral polycrystalline composite having a contact angle of less than 90 degrees and a phase composition consisting essentially of a silicide of molybdenum in an amount of at least about 5% by volume of the composite, elemental silicon in an amount of at least about 1% by volume of the composite, and a member selected from the group consisting of silicon nitride, cubic boron nitride, aluminum nitride, diamond, a silicide of titanium, a silicide of chromium, a silicide of tungsten, a silicide of silver, a silicide of aluminum, elemental molybdenum, a mixture of said silicide of titanium and elemental titanium, a mixture of said silicide of chromium and elemental chromium, a mixture of said silicide of tungsten and elemental tungsten, a mixture of said silicide of silver and elemental silver, a mixture of said silicide of aluminum and elemental aluminum and a mixture thereof, said member of said group being present in an amount of at least about 50% by volume of the composite, said silicide of molybdenum being formed in situ, said composite being bonded by at least said silicide of molybdenum, said composite having a substantially uniform porosity of less than about 10% by volume of said composite.

21. The composite according to claim 20 wherein said silicide of molybdenum is present in an amount of at least about 10% by volume.

* * * * *